UNITED STATES PATENT OFFICE.

THEODOR SCHLÜTER, JR., OF FOERDERSTEDT, NEAR MAGDEBURG, GERMANY.

PROCESS FOR THE PRODUCTION OF A DIGESTIBLE FLOUR FROM BRAN.

No. 897,854.  Specification of Letters Patent.  Patented Sept. 1, 1908.

Application filed May 7, 1907. Serial No. 372,336.

*To all whom it may concern:*

Be it known that I, THEODOR SCHLÜTER, Jr., a subject of the King of Prussia, German Emperor, and resident of Foerderstedt, near Magdeburg, in the German Empire, have invented a new and useful Process for the Production of a Digestible Flour from Bran, of which the following is a specification.

According to my invention the bran is subjected to the so-called breaking process, that is to say, a process for the enlargement of the surface of the bran, so that a flour is obtained which is highly suitable for bread-making and imparts to the bread containing bran converted according to my invention valuable properties hitherto not present.

The bran, in its usual condition being very indigestible and without nutritious action, is converted by my invention into a digestive flour which can be used together with the fine and coarse flour for the production of a most excellent bread.

It is well known that in the bran enzymes *i. e.* diastase and cerealine are contained, which ferments are most suitable for the assimilation of the carbo-hydrates, contained in the bran. For this purpose I subject first the bran to the action of heat and water, whereby the bran suffers a chemical change, and its starch is transformed either into fruit sugar, or partially into fruit sugar and partially into paste. This treatment of the bran also breaks up the walls of the cells of the gluten-layers and renders the gluten assimilable. After this the bran is subjected to a drying process, which lasts either a long or short time in accordance with the special requirements in making the bread. Attention is to be given to the height of the temperature in order to prevent the formed fruit sugar from being converted into glucose or even caramel, and the temperature is preferably selected which will transform the carbo-hydrates into dextrin *i. e.* maltose or pyrodextrin. This drying process results furthermore in rendering the cellulose and the raw fiber of the bran brittle, fitting them for the subsequent grinding of the bran. The flour obtained by this treatment of the bran is to be mixed for the purpose of making bread with fine and coarse flour preferably in proportions as they originally occur in the grain.

Modifications of the process are obtained by changing the quantity of water to be mixed with the bran, and the temperature used in connection with the breaking and the drying process. It may be observed that the step of breaking according to my invention is characterized by the combined action of moisture and heat upon the bran and the duration of the breaking process carried on below 70° C. determines the amount of sugaring effected on the carbo-hydrates of the bran by the enzymes, while the drying process is intended for the evaporation of the water. The quantity of water to be used depends upon whether the mixture of bran and water is to be subjected to a boiling, steaming or baking process. The greatest quantity of water is used when boiling is to take place, while in connection with the baking process only about a third of the quantity of water is to be employed.

It is well known that the enzymes are killed off at a temperature of about 70° centigrade. If the breaking temperature is raised beyond that, the enzymes are already killed off during the breaking process so that in the subsequent drying process any action of the enzymes upon the carbo-hydrates such as starch is prevented and only a small quantity of the latter is converted into fruit sugar. In this case the ground product, is dark colored, as is also the bread obtained from this converted bran-flour mixed with fine flour and coarse flour. If, however, the breaking temperature is kept low and is raised slowly up to 70 degrees centigrade, and also the drying temperature is kept below this limit a prolonged action of the enzymes is insured and the process results in a large formation of fruit sugar whereby the bran flour obtained is of a light color, and the bread also is light and sweet. When the mixture of water and bran is quickly heated up to 100 degrees during the breaking process and then is slowly dried at a low temperature of about 70° C., the formation of fruit sugar is perfectly prevented and only a swelling, thickening and bursting up of the walls of the cells takes place, so that the bread containing bran flour obtained in this manner is light but not sweet. It will be understood that this bursting action of the cell walls occurs in all cases and forms an important feature of the converted bran according to the present invention because such broken up cells offer more surface to the action of the digestive fluids. If, finally the breaking temperature is kept low *i. e.* at about 70° C.

and the drying temperature is high i. e. 100° C. still greater quantities of fruit sugar result from the carbon of hydrates, and the bread having such bran flour is of a dark color.

The process hitherto described is carried out in using only the natural enzymes contained in the bran but for the purpose of hastening the process and rendering it more active i. e. sugaring a greater quantity of the carbo-hydrates, enzymes can be introduced into the bran in the form of malt preparations containing diastase, or chemicals can be added, acting like the said malt-preparations.

The following examples will more fully illustrate my invention. The shells from the grain obtained by the grinding process are ground as far as possible. This step, of course, can be omitted. The shells are mixed with cold water so as to form a thin pulp and the latter boiled in a boiling vessel. It is preferable to increase slowly the temperature up to about 70° C. and then rapidly to 100° C. and more. In boiling the mixture the enzymes contained in the shells are killed off when the temperature is about 70 degrees C., so that in the further course of the boiling process the conversion of the carbo-hydrates (e. g. starch) into fruit sugar is prevented and only a swelling, thickening and bursting of the walls of the cells takes place which action is herein referred to as the breaking action. The time for this breaking process is determined by the temperature, that is to say, the boiling is interrupted when the temperature is about 100 degrees. Then the drying process takes place. The boiled bran-pulp is brought into a baking or drying furnace or in any other suitable drying room and left therein till all the water is evaporated. The dried goods thus obtained are ground to form a fine flour. The duration of the drying process is essentially determined by the quantity of water used in the breaking process.

I will now proceed to describe a process which can be easily carried out in that a small quantity of water is used for the breaking process, and therefore the drying process takes place quickly because only a small quantity of water is to be evaporated. The bran is mixed with water in equal parts by weight and a sticky dough is made therefrom. This dough is cut into pieces of about a length of 30 to 40 centimeters and a height of 15 centimeters. These pieces are put into a baking furnace showing about a temperature of 250° C. and left therein 6 to 8 hours or perhaps still longer till the dough is gradually baked. The pieces are sufficiently heated when they reach a temperature of 95 to 100° C. and a solution of the bran in water strongly reduces Fehling's solution when mixed therewith. From these pieces the crusts are detached, perfectly dried, disintegrated and then ground. In the same manner the wet inner part of the pieces is also disintegrated, dried and ground. The flour thus obtained is used in the bread-making.

It may be observed that it has become known to treat bran with chemical agents, and it has further become known to subject the whole grain to the action of heat and water, and I therefore do not claim the employment of heat and water in general, but what I claim is clearly pointed out and distinguished from the prior knowledge in the following claims.

Having thus fully described the nature of my invention, what I desire to secure by Letters Patent of the United States is:—

The herein described process for the production of a digestible flour from bran, consisting in mixing the bran with boiling water as to form a thin pulp, in heating quickly the pulp up to 100° C., in drying the pulp at a low temperature of about 70° C. till it becomes solid and in grinding the solid mass to a flour.

In witness whereof I have hereunto set my hand in the presence of two witnesses.

THEODOR SCHLÜTER, JR.

Witnesses:
WOLDEMAR HAUPT,
HENRY HASPER.